Patented Aug. 30, 1949

2,480,710

UNITED STATES PATENT OFFICE 2,480,710

ACID AMIDES OF PECTINIC ACID AND PROCESS FOR THEIR PREPARATION

Edwin F. Bryant, Corona, Calif., assignor to California Fruit Growers Exchange, Los Angeles, Calif., a corporation of California No Drawing. Application November 7, 1945, Serial No. 627,290

5 Claims. (Cl. 260—209.5)

The present invention relates to acid amides of pectin, or, to adopt the more precisely correct and accepted scientific terminology, to acid amides of pectinic acid and to methods for the preparation thereof.

The nomenclature for the pectic substances used throughout the specification and claims is intended to be in concord with the recommendations of the Committee for Revision of the Nomenclature of Pectic Substances, the report of which was published in Chemical Engineering News, vol. 22, page 105, for January 25, 1944 Therefore, the term "pectinic acids" as used herein is applied to the colloidal polygalacturonic acids which contain more than a negligible proportion of methyl ester groups.

Briefly stated this invention comprises treating pectinous substances as, for example, pectin either alone or in association with other substances with an alkaline ammonia reagent under controlled conditions of pH, temperature, and time of treatment to produce a new type of pectic substances which, from the experimental evidence I have available I consider to be an acid amide of pectinic acid.

The general object of the invention, therefore, may be stated as the production of acid amides of pectinic acid, and the provision of processes for the accomplishment of this result.

Other objects and advantages will be apparent to those skilled in the art as the description proceeds in connection with the accompanying flow sheet.

The flow sheet below represents in a general manner a preferred embodiment of the process. It is to be understood that the term "amidization" used therein refers to the conversion of carboxyl groups—probably only esterified carboxyl groups—to acid amide groups.

1. Source material—solid pectin
   ↓
2. Amidization—in ammoniacal alcohol
   ↓
3. Drain
   ↓
4. Neutralize—with acidified alcohol
   ↓
5. Filter
   ↓
6. Wash—with alcohol
   ↓
7. Dry In the following example commercial, unstandardized pectin of the so-called "slow setting" type is used for the production of the above-mentioned acid amides of pectinic acid. Pectins of this type are ordinarily not mixed with a diluent or standardizing material. They are low in ash, exhibit good solubility, and have methoxyl contents ranging from about 7.5 to about 10 per cent.

Two hundred kilograms of a pectin of the above-mentioned slow setting type, indicated at 1 on the flow sheet, are suspended in 1000 liters of 65 per cent isopropyl alcohol to which there are added 100 liters of concentrated ammonium hydroxide (average concentration about 28 per cent $NH_3$). To effect the desired conversion the suspension is continuously stirred for a period of about two hours, during which time the temperature is maintained at about 25° C., step 2. This step, substantially without or with only a tolerable amount of depolymerization, converts the pectins to acid amides of pectinic acid. At the end of the treating period the ammoniacal alcohol is drained from the suspension, indicated at 3, and additional 65 per cent isopropyl alcohol is added to the suspension in an amount equal to that drained therefrom. To this suspension there is added with stirring preferably an amount of concentrated hydrochloric acid (average concentration about 36 per cent HCl) necessary to adjust the acidity of the suspension to within the desired pH range, step 4. The pH range is determined by checking the acidity of the suspension at frequent intervals by use of a spot plate and bromphenol blue as an indicator in accordance with well-known technique. The addition of hydrochloric acid to the suspension is stopped when a spot plate test with bromphenol blue shows a light green color. It is found that by adjusting the acidity in this manner the acid amides of pectinic acid subsequently obtained from the process will have an acidity such that the pH of a 1 per cent dispersion will lie within the range of about pH 3 to about pH 4. This pH range is chosen since it about covers the pH at which the acid amides may desirably be used. A condition of acidity represented by a pH much above 5 or below 3 is likely to cause some further, and likely undesirable, modification of the acid amides of pectinic acid during subsequent drying of the product.

The suspension from step 4 is then filtered, indicated at 5, and the acid amide rinsed with several rinses of 65 per cent isopropyl alcohol and finally with a rinse of 90 per cent alcohol, indicated at step 6. After removal of the last mentioned rinse the acid amide is dried, step 7, as for example, in a tray drier.

Treatment of slow setting type pectins in accordance with the above process will produce acid amides of highly satisfactory characteristics.

The nature of the reaction which occurs will, it is believed, be more clearly understood from a consideration of the following:

There appears to be known at present no completely satisfactory structural formula for the pectin molecule. However, its essentially acidic character is definitely established, and recent work has led to a hypothetical structure which, in general, is probably satisfactory in more respects than any heretofore used. According to this hypothesis the pectin molecule is visualized as being based on exceedingly long chains of anhydro galacturonic acid units, bound together through oxygen bridges. Each galacturonic acid unit includes a carboxyl, which may or may not be methoxylated, but is not directly involved in the chain linkage.

The basic structure of pectin, as now commonly conceived, may be illustrated by a fragmentary representation of a portion of a chain, somewhat as shown below:

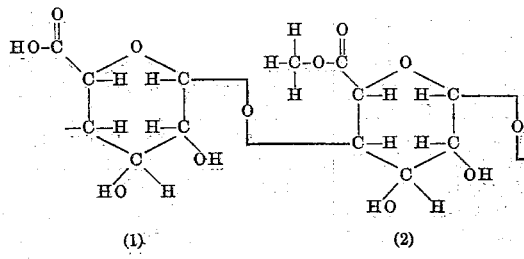

It is to be understood, in interpreting this structural formula in terms of actual configuration, that with respect to the carbon atoms in the ring the atoms or groups shown to the right are considered to be below the plane and those to the left, above. Starting just to the right of the oxygen atom in the ring and proceeding in a clockwise direction, a carbon chain of six members is observed. There is good evidence for the ring formation illustrated, and also for the 1:4 oxygen linkage between rings. The great space shown as occupied by the oxygen bridge, while conventional, is doubtless exaggerated. Probably the inter-atomic distances here are not greater than in other parts of the molecule, particularly since the chain, or molecule, seems rather firmly bound together. In this formula the basic unit (1) is shown with a free carboxyl, while the unit (2) is shown as methoxylated. A number N (perhaps equal to 500 to 1500) of these units are thought to be bonded as suggested into chains. The numbers 500 and 1500 for N are given merely to indicate the general order of magnitude of small and large values. Likewise, the possibility exists that there is some cross linkage of the chains into what may be visualized as bundles of chains.

By simple addition of known atomic weights, it is observed that the combining weight of the unmethoxylated unit (1) should be about 176, while the corresponding weight of the methoxylated unit (2) should be about 190. Actually, the experimentally observed combining weight of pectin usually runs about 220 to 230 per galacturonic unit, while the experimentally observed combining weight of a carefully demethoxylated product (pectic acid) is usually about 200 to 210. However, I believe that these variations of experimental results from the theoretical do not disprove the above theory as to structure, but rather that they are due to consistently and persistently present impurities, and probably to some strongly held water. For, using a carefully demethoxylated product, and subjecting it to rigid purification and to exhaustive drying, it has been possible to secure experimentally a combining weight as low as 180.

Reasoning from the above structural formula, and assuming that all of the carboxyl groups can occur in nature in the methoxylated form, it is theoretically possible for methoxyl groups to be present to the extent of about 16.3% by weight of the pectin molecule, although the most found experimentally is apparently about 12%. Also, theoretically, the pectin molecule might be fully demethoxylated without any evidence of derangement of the basic or fundamental structure of the molecule, but such a pectic substance has not been observed. Ordinarily, pectins are found experimentally to contain from 3% to 11% by weight of methoxyl groups, and in ordinary commercially produced pectin, the methoxyl groups will commonly run about 9% to 10% by weight of the pectin. Obviously, then, there are some carboxyl groups left free, which accounts for the acidic character of pectin.

The free carboxyl groups are capable of combining with reagents to substitute a metal ion for the hydrogen ion. These free carboxyls, in the present process, would apparently combine with the $NH_3$ to form ammonium salts.

The conversion of carboxyls to amide groups is believed to proceed in accordance with the following:

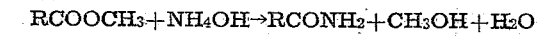

$RCOOCH_3 + NH_4OH \rightarrow RCONH_2 + CH_3OH + H_2O$

It seems probable that only the carboxyl groups which were esterified participate in this reaction and that the carboxyl groups which were free do not.

An amount of ammonia is desirably employed which ranges from 2 times to 16 times the amount theoretically required to demethylate completely the original starting material.

While in the above specific examply dry, commercial slow set pectin has been used as the starting point for the production of the acid amides, it is possible to prepare the acid amides from source materials other than dry commercial pectin as, for example, they may be made from an alcohol precipitate of pectin or from metal pectinates.

The pectin may be extracted from its source material as, for example, citrus fruit by any one of several methods, the most common of which involves heating the source material in the presence of acidified water under carefully controlled conditions of time, temperature, and hydrogen ion concentration, all as is well known. The pectin extract is then clarified and may be concentrated if desired. The separation of the pectin from the clarified extract may be accomplished by an alcoholic precipitation of the pectin or by precipitation by use of various metal compounds. The methods which involve the separation of the pectin from the aqueous extract by the use of metal compounds yield a pectin product having metal or metal compounds associated therewith. In order to purify the pectin for the starting material, these compounds are leached with acidified alcohol so that the metal compounds are for the most part removed prior to conversion. After the precipitated pectin has been leached with acid alcohol to remove the metal contaminants it may then be treated by known methods to prolong its setting time, although this is not a necessary step in the production of the acid amide products. This treatment involves maintaining the pectin in contact with an acidic reagent for a time and at a temperature and pH suitable to effect the desired change in the setting characteristics of the pectin. After the adjustment of the setting characteristics of the pectin has been effected, the pectin precipitate may be treated with an alkaline ammonia agent in accordance with this invention.

As an example of the above, 1400 kilograms of such an undried pectin precipitate containing about 25 per cent pectin and 75 per cent dilute alcohol are suspended in about 2000 liters of 75 per cent isopropyl alcohol to which there are added 390 liters of commercial ammonium hydroxide (average concentration 28 per cent $NH_3$). The suspension is continually stirred for about two hours during which time the temperature is maintained at about 25° C. At the end of the treating time the alcohol is drained from the slurry and the compound resuspended in a further amount of alcohol to which hydrochloric acid is added to adjust the product to within the desired pH range in accordance with the method previously disclosed. The product is then filtered from the suspension and further washed with strong alcohol and dried.

It is obvious that many modifications of the above outlined processes will readily occur to those skilled in this art. Due to the interrelationship of the several factors in the processes, as for example, the temperature at which the various treatments are carried on, the length of time of the treatment, the pH at which the treatments are effected, and the source material being treated, many possible modifications are indicated. As a general rule the variables of temperature, time of treatment, and pH during conversion of the carboxylic esters to amide groups are interrelated so that many combinations of these three factors may be used as long as the process is operated within the ranges hereinafter disclosed. The variables should be balanced one against the other so that the process may be operated to the greatest economic advantage. The time of treatment should not be unduly prolonged nor should it be so short that it is difficult to control. The temperature and pH should be adjusted so that the best results are obtained for the least possible cost.

My preferred products are found to possess approximately the following distribution of the total carboxyl groups originally present either as free carboxyls or as methyl esters:

|  | Per cent |
|---|---|
| Free carboxyls | 12 to 20 |
| —$NH_4$ salts | 25 to 35 |
| —$CONH_2$ groups | 20 to 30 |
| Methyl esters | 25 to 35 |

While the examples mention the alkaline ammonia conversion of pectin extracted from citrus fruits, it is obvious that the pectin extracted from other fruits and vegetables as, for example, apples, sugar beets, carrots, etc. may be treated in accordance with this invention.

Furthermore, from the above disclosures it is obvious that the treatment of the pectin may be carried out on purified or partially purified pectin. The treatment may be carried on while the pectic substances are still in association with the cellulosic constituents with which they ordinarily occur in nature. For example, citrus peel may, if desired, be treated with acidified alcohol to convert the protopectin to pectin in situ. Then the pectin in the peel may be converted with a reagent such as ammonium hydroxide in alcohol in much the same manner as indicated above with respect to precipitated pectin, although some modifications of the process, all within the present teachings, will be necessary, in view of the different characteristics of the starting material. When using peel or pomace it is not necessary that the acid alcohol treatment be employed; such peel may be treated directly with the alkaline ammonia compound. When using some commercial pectins which may perhaps contain relatively large amounts of alkaline earth metals and/or heavy metals associated therewith, it may be desirable, although it is not necessary, to first remove these contaminants either by acid alcohol washing or by dispersing the pectin and effecting ionic exchanges in accordance with methods already well known. As a practical operation it is difficult or impossible to obtain pectins totally free from these constituents. However, they can be made sufficiently free for all commercial purposes, as for example, by the methods disclosed in U. S. Patents Nos. 1,497,884 and 2,300,651, the products of which may be regarded for the purposes of the present process as substantially free from these constituents. The acid amides may be further treated with acidified alcohol after they have been prepared if it is found that their solubility is impaired by the presence of alkaline earth and/or heavy metals.

When conversion is carried on in alcohol, as in step 2, it is difficult to test the pH of the solution so that small pilot batches should be run to determine the amount of alkaline ammonia reagent and time necessary to effect the desired conversion of the source material being treated without getting excessive depolymerization. If excessive depolymerization is obtained subsequent utilization of these new pectic substances may be greatly impaired.

Various alcohols may be used in the step indicated at 2, as for example, ethyl alcohol and butyl alcohol. In general those relatively low boiling, fluid, organic compounds or "solvents" are useful which are non-solvents for pectin and are inert toward it and which are capable of carrying the alkaline reagents employed and which are little or not at all affected thereby.

While hydrochloric acid has been used in the process and the modifications disclosed, other acids may suitably be used as nitric acid, sulfuric acid, acetic acid, phosphoric acid, or other acids which may be removed by washing with alcohol or other non-solvents for the acid amides.

It is ordinarily convenient and desirable to maintain the temperature of the pectinous substances being treated within the range of from about 15° C. to 35° C. during the conversion. Seasonable temperatures are therefore indicated unless extreme conditions are encountered.

When effecting conversion at seasonable temperatures and within the pH range previously mentioned, the time will vary depending upon the degree of conversion sought as well as upon the temperature and the pH. Ordinarily a treating time of from about thirty minutes to several hours is adequate although under some conditions shorter or longer times of treatment may be necessary. The higher relative proportions of ammonia will, other things being equal, result in conversion of a relatively greater proportion of carboxyl groups to amide groups.

My new products are capable of producing jellies with a wide variety of aqueous fluids and have the highly interesting and useful property of not requiring the presence of sugar or its equivalent, although sugar may be incorporated as a sweetening without adverse effects, as may other flavoring constituents. Calcium or its equivalent is required for the jelly formation. Moreover, my products are not subject to the limitations as to equivalent weight that have been stated in the art as being possessed by certain other pectic substances capable of forming jellies in a somewhat similar manner. My products produce jellies of very superior physical characteristics.

In general the manner of use of my new products is to dissolve, preferably by use of heat, the desired amount, according to the stiffness or firmness of gel desired, in the aqueous fluid to be jellified. A calcium salt may be added if needed. This is all well understood by those skilled in this art.

Having thus described this invention in such full, clear, concise, and exact language as to enable others skilled in the art to make and use the same, I claim as my invention and desire to secure by Letters Patent the following:

1. An acid amide of pectinic acid having about 20 to 30% of its carboxylic groups converted to amide groups.

2. An acid amide of pectinic acid having about 20 to 30% of its carboxylic groups converted to amide groups and about 12 to 20% of its carboxylic groups as free carboxyls.

3. A method of preparing acid amides of pectinic acid, comprising contacting solid, previously precipitated pectin with an alkaline ammonia reagent which is a non-solvent for pectic substances, which reagent contains 2 to 16 times the amount of ammonia theoretically required for complete demethylation of the pectin, and which is adapted to convert from about 20 to about 30% of the carboxylic groups of the pectin to amide groups, the pectin being maintained in contact with the alkaline ammonia reagent for a period of time and at a temperature insufficient to materially depolymerize the pectin but sufficient to convert from about 20 to about 30% of the carboxylic groups of the pectin to amide groups, and subsequently treating the amide compound with acid to produce an acid acid amide of pectinic acid having about 20 to about 30% of its carboxylic groups converted to amide groups.

4. A method of preparing acid amides of pectinic acid, comprising contacting solid, previously precipitated pectin with alkaline ammoniacal alcohol containing 2 to 16 times the amount of ammonia theoretically required for complete demethylation of the pectin and which is adapted to convert from about 20 to about 30% of the carboxylic groups of the pectin to amide groups, the pectin being maintained in contact with the alkaline ammoniacal alcohol for a period of time and at a temperature insufficient to materially depolymerize the pectin but sufficient to convert from about 20 to about 30% of the carboxylic groups of the pectin to amide groups, and subsequently treating the amide compound with acid to produce an acid acid amide of pectinic acid having about 20 to about 30% of its carboxylic groups converted to amide groups.

5. A method of preparing acid amides of pectinic acid, comprising contacting solid, previously precipitated pectin with alkaline ammoniacal alcohol containing 2 to 16 times the amount of ammonia theoretically required for complete demethylation of the pectin and which is adapted to convert from about 20 to about 30% of the carboxylic groups of the pectin to amide groups, the pectin being maintained in contact with the alkaline ammoniacal alcohol for a period of time and at a temperature insufficient to materially depolymerize the pectin but sufficient to convert from about 20 to about 30% of the carboxylic groups of the pectin to amide groups, and subsequently treating the amide compound with acid to produce an acid acid amide of pectinic acid having about 20 to about 30% of its carboxylic groups converted to amide groups and about 12 to about 20% of its carboxylic groups as free carboxyls.

EDWIN F. BRYANT.

REFERENCES CITED

The following references are of record in the file of this patent:

UNITED STATES PATENTS

| Number | Name | Date |
| --- | --- | --- |
| 2,133,273 | Cox | Oct. 18, 1938 |

FOREIGN PATENTS

| Number | Country | Date |
| --- | --- | --- |
| 541,528 | Great Britain | Dec. 1, 1941 |